US010794720B2

(12) United States Patent
Slavin et al.

(10) Patent No.: US 10,794,720 B2
(45) Date of Patent: Oct. 6, 2020

(54) LANE-LEVEL VEHICLE NAVIGATION FOR VEHICLE ROUTING AND TRAFFIC MANAGEMENT

(71) Applicant: Caliper Corporation, Newton, MA (US)

(72) Inventors: Howard Slavin, Waban, MA (US); Qi Yang, McLean, VA (US); Daniel Morgan, Roslindale, MA (US); Andres Rabinowicz, Newton, MA (US); Jonathan Brandon, Newton Centre, MA (US); Ramachandran Balakrishna, Acton, MA (US)

(73) Assignee: Caliper Corporation, Newton, MA (US)

( * ) Notice: Subject to any disclaimer, the term of this patent is extended or adjusted under 35 U.S.C. 154(b) by 88 days.

(21) Appl. No.: 15/971,010

(22) Filed: May 4, 2018

(65) Prior Publication Data

US 2018/0299290 A1    Oct. 18, 2018

Related U.S. Application Data

(63) Continuation of application No. 14/210,673, filed on Mar. 14, 2014, now Pat. No. 9,964,414.
(Continued)

(51) Int. Cl.
*G01C 21/36* (2006.01)
*G01C 21/34* (2006.01)
(Continued)

(52) U.S. Cl.
CPC ..... *G01C 21/3658* (2013.01); *G01C 21/3492* (2013.01); *G08G 1/0116* (2013.01);
(Continued)

(58) Field of Classification Search
CPC ............ G01C 21/3658; G01C 21/3492; G08G 1/0145; G08G 1/0129; G08G 1/0116;
(Continued)

(56) References Cited

U.S. PATENT DOCUMENTS

| 5,177,685 A | 1/1993 | Davis et al. |
| 5,381,338 A | 1/1995 | Wysocki et al. |

(Continued)

FOREIGN PATENT DOCUMENTS

| CN | 102235879 | 11/2011 |
| JP | 2009/047491 | 3/2009 |

(Continued)

OTHER PUBLICATIONS de Oliveira "Reinforcement Learning-based Control of Traffic Lights in Non-stationary Environments: A Case Study in a Microscopic Simulator", see attached PDF version. 4th European Workshop on Multi-Agent Systems, Lisbon, Portugal, Dec. 14-15, 2006; internet archived May 13, 2012 (Year: 2006).*
(Continued)

*Primary Examiner* — Michael V Kerrigan
(74) *Attorney, Agent, or Firm* — Haley Guiliano LLP; Jeffrey H. Ingerman

(57) ABSTRACT

Lane-level vehicle routing and navigation apparatus includes a simulation module that performs microsimulation of individual vehicles in a traffic stream, and a lane-level optimizer that evaluates conditions along candidate paths from an origin to a destination as determined by the simulation module, and determines recommended lane-level maneuvers along the candidate paths. A link-level optimizer determines the candidate paths based on link travel times determined by the simulation module. The simulation may be based on real-time traffic condition data. Recommended candidate paths may be provided to delivery or service or
(Continued)

emergency response vehicles, or used for evacuation planning, or to route vehicles such as garbage or postal trucks, or snowplows. Corresponding methods also may be used for traffic planning and management, including determining, based on microsimulation, (a) altered road geometry, (b) altered traffic signal settings, such as traffic signal timing, and/or (c) road pricing.

13 Claims, 8 Drawing Sheets

Related U.S. Application Data

(60) Provisional application No. 61/789,019, filed on Mar. 15, 2013.

(51) Int. Cl.
    *G08G 1/01* (2006.01)
    *G08G 1/0967* (2006.01)

(52) U.S. Cl.
    CPC ......... *G08G 1/0129* (2013.01); *G08G 1/0145* (2013.01); *G08G 1/096716* (2013.01); *G08G 1/096741* (2013.01); *G08G 1/096775* (2013.01)

(58) Field of Classification Search
    CPC ....... G08G 1/096775; G08G 1/096741; G08G 1/096716
    See application file for complete search history.

(56) References Cited

U.S. PATENT DOCUMENTS

| | | | |
|---|---|---|---|
| 5,426,780 A | 6/1995 | Gerull et al. | |
| 5,798,949 A | 8/1998 | Kaub | |
| 5,802,492 A | 9/1998 | DeLorme et al. | |
| 5,822,712 A | 10/1998 | Olsson | |
| 5,863,203 A | 1/1999 | Bragdon | |
| 5,902,350 A | 5/1999 | Tamai et al. | |
| 5,910,177 A | 6/1999 | Zuber | |
| 5,933,100 A | 8/1999 | Golding | |
| 5,968,109 A | 10/1999 | Israni et al. | |
| 6,028,550 A | 2/2000 | Froeberg et al. | |
| 6,111,539 A | 8/2000 | Mannings et al. | |
| 6,150,961 A | 11/2000 | Alewine et al. | |
| 6,209,026 B1 | 3/2001 | Ran et al. | |
| 6,216,088 B1 | 4/2001 | Schulz et al. | |
| 6,233,517 B1 | 5/2001 | Froeberg | |
| 6,236,933 B1 | 5/2001 | Lang | |
| 6,261,100 B1 | 7/2001 | Bragdon | |
| 6,308,132 B1 | 10/2001 | Wilson et al. | |
| 6,317,686 B1 | 11/2001 | Ran | |
| 6,321,158 B1 | 11/2001 | DeLorme et al. | |
| 6,339,745 B1 | 1/2002 | Novik | |
| 6,370,475 B1 | 4/2002 | Breed et al. | |
| 6,381,533 B1 | 4/2002 | Crane et al. | |
| 6,381,534 B2 | 4/2002 | Takayama et al. | |
| 6,385,539 B1 | 5/2002 | Wilson et al. | |
| 6,389,356 B1 | 5/2002 | Onishi | |
| 6,405,132 B1 | 6/2002 | Breed et al. | |
| 6,415,226 B1 | 7/2002 | Kozak | |
| 6,430,499 B1 | 8/2002 | Nakano et al. | |
| 6,487,305 B2 | 11/2002 | Kambe et al. | |
| 7,072,764 B2 | 7/2006 | Donath et al. | |
| 7,103,475 B2 | 9/2006 | Irie | |
| 7,155,376 B2 | 12/2006 | Yang et al. | |
| 7,197,500 B1 | 3/2007 | Israni et al. | |
| 7,805,442 B1 | 9/2010 | Joshi et al. | |
| 7,809,503 B2 | 10/2010 | Nakamura et al. | |
| 7,930,095 B2 | 4/2011 | Lee | |
| 8,335,641 B2 | 12/2012 | Nakayama et al. | |
| 8,484,002 B2 | 7/2013 | Yang et al. | |
| 9,076,332 B2 * | 7/2015 | Myr ......................... G08G 1/04 |
| 9,146,127 B2 | 9/2015 | Bank et al. | |
| 2001/0020211 A1 | 9/2001 | Takayama et al. | |
| 2001/0037176 A1 | 11/2001 | Mikame | |
| 2001/0040984 A1 | 11/2001 | Kambe et al. | |
| 2002/0036584 A1 | 3/2002 | Jocoy et al. | |
| 2002/0120728 A1 | 8/2002 | Braatz et al. | |
| 2002/0138197 A1 | 9/2002 | Schramke et al. | |
| 2002/0184236 A1 | 12/2002 | Donath et al. | |
| 2004/0248583 A1 | 12/2004 | Satt et al. | |
| 2005/0149251 A1 | 7/2005 | Donath et al. | |
| 2007/0093997 A1 | 4/2007 | Yang et al. | |
| 2010/0063715 A1 | 3/2010 | Wynter et al. | |
| 2010/0114469 A1 | 5/2010 | Chao et al. | |
| 2010/0228467 A1 | 9/2010 | Wolfe | |
| 2011/0301838 A1 | 12/2011 | Isert | |
| 2013/0275033 A1 | 10/2013 | Bastiaensen et al. | |
| 2013/0282346 A1 | 10/2013 | Yang et al. | |
| 2013/0325331 A1 | 12/2013 | Coleman et al. | |

FOREIGN PATENT DOCUMENTS

| | | |
|---|---|---|
| KR | 10-2007-0067051 | 6/2007 |
| KR | 10-2010-0073258 | 7/2010 |
| TW | 201232487 | 8/2012 |
| WO | WO2009/065206 | 5/2009 |
| WO | WO2012/089282 | 7/2012 |

OTHER PUBLICATIONS de Oliveira proof of internet archive date (see attached PDF version "de Oliveira archive date") (Year: 2012).*

Alexiadis, V., et al., *Traffic Analysis Toolbox; vol. I: Traffic Analysis Tools Primer*, Federal Highway Administration (Jun. 2004), p. 8.

Balakrishna, R., et al., "Comparison of Simulation-Based Dynamic Traffic Assignment Approaches for Planning and Operations Management," *Proceedings of the 4th Transportation Resource Board Conference on Innovation in Travel Modeling (ITM)*, Tampa, Florida, Apr. 30-May 2, 2012.

Barcelo, J. et al., "Interfacing EMME/2 with AIMSUN2 Microsimulator," *First Asian EMME/2 Users' Meeting in Shanghai*, P.R. China, Aug. 23-24, 1999.

Bespalko, S.J., et al., "The Need for a Formal GIS Transportation Model," *International Conference and Workshop on Interoperating Geographic Information Systems* (Interop '97), Santa Barbara, California, Dec. 3-6, 1997.

Bloomberg, L. et al., "A Comparison of the VISSIM and CORSIM Traffic Simulation Models on a Congested Network," Submission for Publication in the *Transportation Research Record*, pp. 1-23, Mar. 2000.

Caliper Corporation *GISDK Geographic Information System Developer's Kit, Programmer's Guide 4.0*, Caliper Corporation, 1998.

Caliper Corporation, *Routing and Logistics with TransCAD 4.0*, 2002.

Caliper Corporation, *TransCAD Transportation GIS Software User's Guide*, 2000.

Caliper Corporation, *Travel Demand Modeling with TransCAD 4.0*, 2001.

Chiu, Y.-C., et al., "Dynamic Traffic Assignment: A Primer," *Transportation Research Circular*, No. E-C153, Jun. 2011.

Claramunt, C. et al., "A New Framework for the Integration, Analysis and Visulisation of Urban Traffic Data Within Geographic Information Systems," *Transportation Research Part C: Emerging Technologies*, vol. 8, pp. 167 84, Sep. 19, 2000.

Claramunt, C. et al., "A real-time GIS for the analysis of a traffic system," *Africon: IEEE* 1999, pp. 15-20, IEEE Catalog No. 99CH36342.

Fisher, K.M., "TRANSIMS Is Coming!," *Public Roads*, vol. 63, No. 5, Mar./Apr. 2000.

Fohl, P. et al., "A Non-Planar, Lane-Based Navigable Data Model for ITS," *Proceedings, 7th International Symposium on Spatial Data Handling*, pp. 7B/17-29, Delft, Aug. 12-16, 1996.

Goodchild, M.F., "Geographic Information Systems and Disaggregate Transportation Modeling," *Geographical Systems* 5(1-2), pp. 19-44, 1998.

(56) References Cited

OTHER PUBLICATIONS

Goodchild, M.F., "GIS and Transportation: Status and Challenges," National Center for Geographic Information and Analysis (NCGIA) University of California, Santa Barbara, 1999.

Hatton, C.C., "GIS-T7F: A Geographic Information System-Data Input Module for the Traffic Signal Simulation Model TRANSYT-7F," Thesis presented to the Academic Faculty of Georgia Institute of Technology, Aug. 1991.

Holtzman, J. et al., "A vehicular traffic GIS and simulator for route guidance on NY/NJ highways," *Proc. IEEE-IEE Vehicle Nav. and Info. Sys. Conf.*, Ottawa, Ontario, Canada, Oct. 1993, pp. 367 72, IEEE Catalog No. 93CH3285-4.

Jayakrishnan, R., et al., "Distributed Computing and Simulation in a Traffic Research Test Bed," *Computer-Aided Civil and Infrastructure Engineering*, vol. 14, pp. 429 33, 1999.

Kim, K.-H. et al., "Managing scheme for 3-dimensional geo-features using XML," *IGARSS*, Honolulu Jul. 2000, vol. 7, pp. 2899-2901, IEEE Catalog No. 00CH37120.

KLD Associates, Inc., "UNITES Software Announced".

Lieberman, E., "Integrating GIS, simulation and animation," *Simulation Conference*, Phoenix 1991, pp. 771-775.

Lieberman, E., et al., "Traffic Simulation," *Traffic Flow Theory, A State-of-the-Art Report* (N. Gartner et al., eds.), of Turner-Fairbank Highway Research Center, Federal Highway Administration, U.S. Dept. of Transportation, pp. 10-1-10-23, 1997.

Nagel, K., "Low Fidelity Microsimulation of Vehicle Traffic on Supercomputers," *Transportation Research Board*, Paper No. 940901, Jan. 9-13, 1994.

Nagel, K., et al., "The Dynamics of Iterated Transportation Simulations," Submitted to *Transportation Research C*, Feb. 18, 2000 (earlier version presented at the TRIannual Symposium on Transportation Analysis (TRISTAN-III) in San Juan, Puerto Rico).

Newstrom, B., "Real Time High Accuracy Geo-Spatial Database for Onboard Intelligent Vehicle Applications," Thesis submitted to the faculty of the Graduate School of the University of Minnesota, Oct. 2000.

Oh, J.S., et al., "Microscopic Simulation with Large-Network Path Dynamics for Advanced Traffic Management and Information Systems," Institute of Transportation Studies, University of California at Irvine, Dec. 1999.

Owen, L.E., "Traffic Flow Simulation Using Corsim," *Proceedings of the 2000 Winter Simulation Conference* (Jones, J.A., et al., eds.), pp. 1143-1147, 2000.

Poschinger, A., et al., "The Flow of Data in Coupled Microscopic and Macroscopic Traffic Simulation Models " *From Vision to Reality, Proceedings of the 7th World Congress on Intelligent Transport Systems* in Turin, Italy, Nov. 6-9, 2000.

Rilett, L.R., et al., "A Comparison of the Low Fidelity TRANSIMS and High Fidelity CORSIM Highway Simulation Models Using its Data," *Texas Transportation Institute Paper No. 00-0678*, Jan. 2000.

Sabra, Z. Dr., "Traffic Analysis Software Tools," *Transportation Research Circular*, No. E-CO14, Sep. 2000.

Sarasua, W.A., "Applying GIS Technology to Traffic Signal Coordination," *Transportation Research Board Paper No. 940594*, Jan. 9-13, 1994.

Slavin, H., "An Integrated, Dynamic Approach to Travel Demand Forecasting," *Transportation*, vol. 23, pp. 313-350, Kluwer Academic Publishers 1996.

Smith, L. et al., "TRANSIMS: Project Summary and Status May 1995," accessed on Nov. 12, 2005 at www.ntl.bts.gov/DOCS/466.html.

Sung, K. et al., "Integration of Macro and Micro Traffic Simulation Analysis by Using Windowing Method," Hanyang University (Japanese with English Translation).

*TRANSIMS Travelogue*, Jun. 1995.

Yang, Q., "A Simulation Laboratory for Evaluation of Dynamic Traffic Management Systems," Thesis submitted to the Department of Civil and Environmental Engineering, Massachusetts Institute of Technology, Jun. 1997.

Yang, Q., "A Simulation Laboratory for Evaluation of Dynamic Traffic Management Systems," Presentation at the 79th Annual Meeting of Transportation Research Board, TRB Paper No. 00-1688, Nov. 19, 1999.

\* cited by examiner

# LANE-LEVEL VEHICLE NAVIGATION FOR VEHICLE ROUTING AND TRAFFIC MANAGEMENT

CROSS REFERENCE TO RELATED APPLICATIONS

This is a continuation of commonly-assigned U.S. patent application Ser. No. 14/210,673, filed Mar. 14, 2014 (now U.S. Pat. No. 9,964,414) which claims the benefit of commonly-assigned U.S. Provisional Patent Application No. 61/789,019, filed Mar. 15, 2013 and therewith, each of which is hereby incorporated by reference herein in its respective entirety.

BACKGROUND OF THE INVENTION

This invention provides processes and apparatus for providing lane-level route guidance for individual vehicles of various types through transportation networks for making trips between widely separated trip origins and destinations and methods for managing regional and corridor traffic at the lane level through measurement, simulation, and optimization to identify effective routing strategies for one, some, and/or very large numbers of diverse motor vehicles. The invention also provides for improved methods and apparatus for traffic planning and management as well as traffic simulation and prediction.

There are great inefficiencies in the usage of road networks that come from poor choice of routes and lanes by individual drivers, leading to congestion and delay for both the individual driver and large numbers of individuals traveling in other vehicles. Emergency vehicles struggle to get to their destinations and often are not certain of the best routes to take or which lanes of travel would be the fastest for their mission. Known navigation and traffic management systems that could potentially identify and implement congestion-relieving guidance are primitive and may even be counter-productive when the same information is given to all drivers.

SUMMARY OF THE INVENTION

A lane-level vehicle routing and navigation apparatus according to embodiments of the invention includes a simulation module that performs microsimulation of individual vehicles in a traffic stream, and a lane-level route optimizer that evaluates predicted conditions along candidate paths from an origin to a destination as determined by the simulation module, and determines recommended lanes to use and the associated lane-level maneuvers along the candidate paths. A link-level optimizer may be used to determine the candidate paths based on link travel times determined by the simulation module which then may be further refined with the lane-level optimizer. The simulation may be based on real-time traffic condition data.

The lane-level optimizer may take account of the operation of traffic controls along the candidate paths, including simulation of the traffic controls or real-time traffic control data. The simulation may be multi-threaded and/or distributed for faster computation in order to provide more timely navigation guidance or to evaluate multiple alternatives simultaneously.

In accordance with another embodiment of the invention, a lane-level vehicle routing and navigation apparatus includes a simulation module that performs microsimulation of individual vehicles in a traffic stream to recommend candidate paths at lane level, and inputs for real-time traffic condition data, wherein the microsimulation is based at least in part on said real-time traffic condition data.

Candidate lane-level paths may be provided to emergency response vehicles, or used for evacuation planning, or to route vehicles which seek to traverse entire groups of road segments, such as garbage or mail trucks, or snowplows.

Methods in accordance with the invention are also provided. The methods also may be used for traffic planning or management, including determining, based on microsimulation, at least one of (a) improvements to road geometry, or (b) traffic signal settings and improvements to traffic signal timing.

The invention includes improvements to traffic microsimulation methods by taking account of more realistic lane level trajectory selections made by drivers. Within the context of a single simulation run, a look ahead mechanism is used to identify better lane-level guidance and ensure that the guidance is feasible in light of other traffic in later time intervals. The look ahead mechanism also improves other aspects of traffic microsimulation.

These methods can be especially effective in future autonomous vehicle systems that require lane-level guidance that is appropriate in light of other traffic and that further enable lane-level navigation through the ability to locate vehicles by their lane of travel.

BRIEF DESCRIPTION OF THE DRAWINGS

The above and other objects and advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
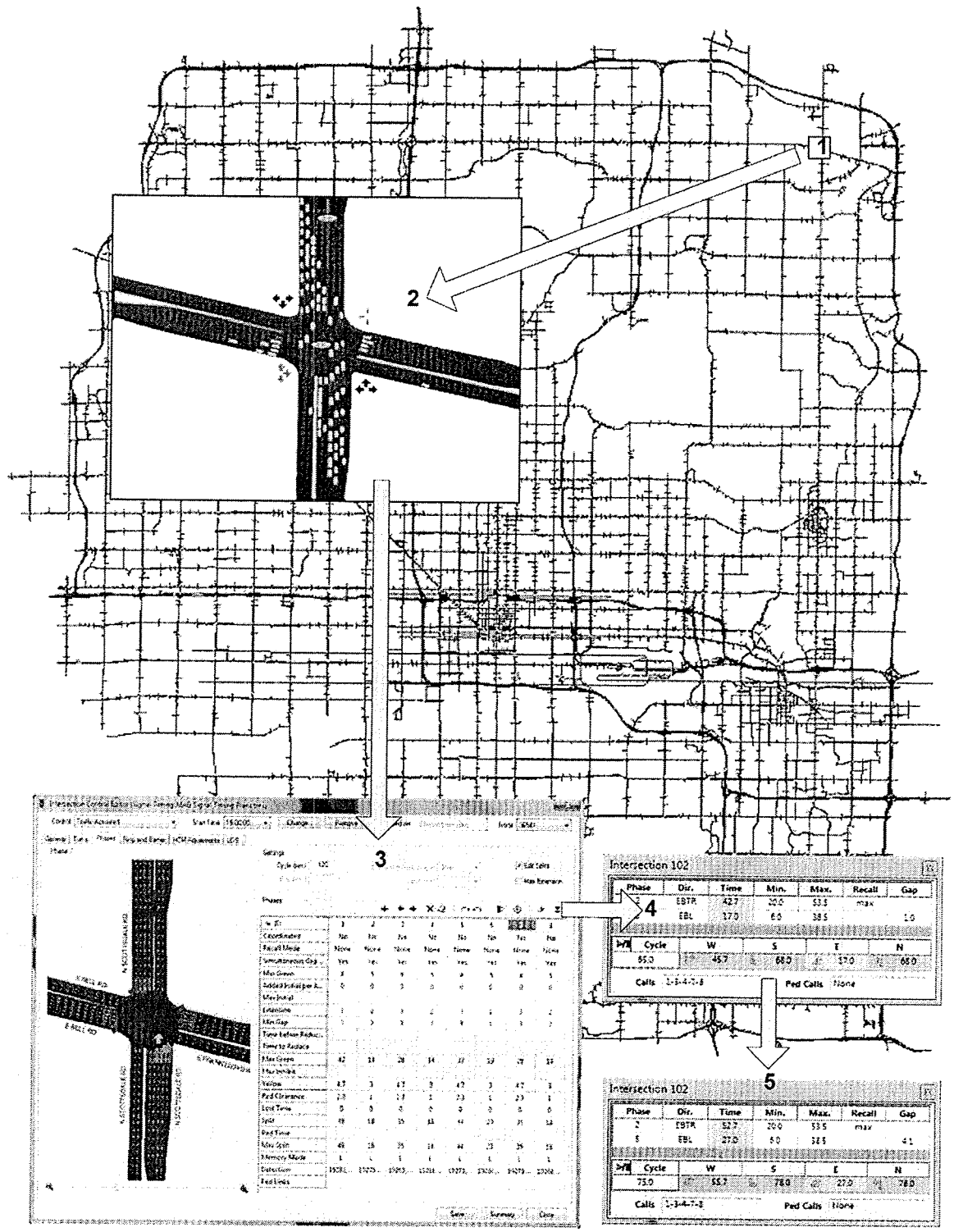
FIG. 1 is a visual representation of a microsimulation of traffic in Phoenix, Ariz.

Existing navigation systems provide route guidance primarily by choosing routes based upon expected link travel times and turn penalties, and occasionally preferences for use of certain types or classes of roads. These systems can readily identify the locations where mandatory lane changes are required to traverse a particular recommended or chosen path, but are not sensitive to the best lanes to use in various traffic situations and in different locations. They also fail to represent barriers and restrictions on lane use and lane changes explicitly. None considers traffic congestion at the lane level explicitly, or recognizes the differences in driver behavior for choosing lanes or even alternative paths when certain lanes are congested or inaccessible. With lane-level data, more effective routes and lane choices can be determined. Processes that exploit lane-level detail in route guidance navigation can be further evaluated and also refined through appropriate traffic simulation.

The prevailing view has been that mesoscopic traffic simulation, which lacks lane-level modeling detail, is the only feasible method of providing real-time route guidance because microscopic simulation models have not yet been built at a large enough geographic scale, and would be too expensive to build and validate or too computationally demanding to be useful. Obstacles to region-wide traffic microsimulation have traditionally included lack of detailed data on trip patterns by time of day and network performance by road segment and the lanes therein, difficulties in modeling driver route choice, problems in accurate simulation of large numbers of vehicles especially under heavily congested traffic conditions, as well as the computational burden of performing the simulation within a short enough time for the results to be useful. However, microsimulation at the regional scale can be implemented using methods described in commonly-assigned U.S. Pat. No. 7,155,376, which is hereby incorporated by reference herein in its entirety.

In traffic simulation, and particularly in microscopic traffic simulation in which vehicles are simulated with lane-level detail, route guidance can be provided to vehicles while at the same time considering other traffic on the network. Yet existing simulation-based systems attempt to model actual driver behavior and discretionary lane changing without regard to normative strategies for lane use from an origin to a destination or a portion of a route. Consequently, these systems cannot properly determine the best lanes to use for an entire trip or a portion of a trip or the locations within road links at which to attempt or make lane changes based upon historical, measured, simulated, or forecasted lane-level densities and possible speeds.

Current commercially available navigation systems, and navigation guidance provided by Internet sources, can frequently identify congestion as it takes place and provide alternative routes. This guidance has three fundamental limitations. First, all travelers between the same two locations are given the same guidance which itself can be counter-productive. Second, and more seriously, it is assumed that current conditions will continue to prevail long enough for the route guidance to be pertinent. This may seldom be the case as congestion may be worsening or lessening at any point in time. Third, there is no specific guidance regarding which lanes in specific locations would provide better expected travel times than other lanes.

Systems have been proposed that rely on historical data at the lane level, or lane-level probe data, or both, but neither historical nor current data may apply at all to the travel conditions that will be experienced at some point in time. Changes in real world conditions such as weather or special events or accidents will render such prior data misleading. Also, typically historical data or probe data will not be available for all lane segments and movements through intersections. While statistical methods such as autoregressive models that have been proposed might be used to fill in missing observations, those methods still have the same limitations of reliance upon the past experience and conditions.

There may be other limitations as well such as the failure to capture the effects of traffic signals or blocked intersections, double-parked vehicles, and pedestrians, as well as failure to consider the variability of the travel environment which may render guidance based on average conditions considerably sub-optimal.

Adaptive traffic signal systems and other measures like ramp-metering can lead to different performance of the traffic system at different congestion levels. Failure to represent the behavior and impact of these mechanisms can lead to faulty or sub-optimal route guidance.

Explicit consideration of other vehicles and the mix of other vehicular traffic can be advantageous in routing and traffic management. It is well-understood that the presence of even one or a few slow vehicles can drastically and stochastically impact overall traffic flow and cause congestion. Also, the percentage of trucks, especially large trucks, is known to have a significant impact on network performance. Without vehicle-level modeling, the presence of slow vehicles could not be taken into account.

New forms of data collection from crowd-sourcing, mobile phones, aerial imagery, LIDAR, more precise Global Positioning System devices, road sensors, on-board sensors, and road cameras are gradually lowering the data barriers for region-wide simulation. While not all of the new data sources have lane-level geographic resolution and precision, the supply of lane-level information available for routing, traffic simulation, and traffic management purposes should be expected to increase.

Current navigation systems treat time coarsely, if at all, when providing route guidance. There may be expected link travel times or speeds that are used that correspond to peak periods and other times of the day or they may simply use some composite of travel times based upon posted speeds and/or speeds observed in real time. Typically these speeds vary by the functional class of a road, but are not collected or observed for each single road link in a region or beyond. Some systems can make use of real-time data on congestion, but these data are typically restricted to the main highways and cannot take account of conditions on arterials or on the conditions that will prevail more than 15-30 minutes into the future. None of these systems use lane-level information explicitly for routing, except possibly to indicate how many lanes are provided for each turn when following a route.

Existing traffic management systems, even the most advanced real-time traffic management and control systems, use simplified models for prediction. Travel demand and travel times are either based on historical data or limited real-time measurements. There is no evidence for the estimation of lane-level travel demand and optimization of traffic flow based on such demand.

In one known system that uses a mesoscopic simulation method, the supply side traffic performance is treated at the link level and not at the lane level. Generally speaking, the research literature has taught that microsimulation cannot be feasible for entire regions and cannot be computed quickly enough to provide navigation guidance.

However, above-incorporated U.S. Pat. No. 7,155,376 describes a lane-level GIS database suitable for routing and traffic microsimulation. Based on that system, a working microsimulation model of all of the traffic flowing within a 500 square mile area of Phoenix, Ariz. has been developed, and even on a laptop computer, this simulation runs faster than real time. With additional enhancement, further speed improvements can be achieved making use of the system for navigation a reality. Methods and apparatus provided herein generate more detailed and more efficient route guidance for one vehicle—a single-occupant automobile, a carpool vehicle (which may have additional available lane-use alternatives such as high-occupancy vehicle (HOV) lanes), a truck, a bus, a motorcycle, or a bicycle—and also provide for management and amelioration of traffic congestion that results from a plurality of vehicles traversing paths from widely-separated origins and destinations within a large metropolitan region. Lane-use permissions and restrictions for different vehicle types (such as the carpool case noted above) also may be taken into account in lane-level routing.

These improved processes are based on the ability to store, manage, and utilize time-dependent, lane-level information on traffic and geometric conditions on highways and between and within intersections on streets. Between intersections, a road may be divided into segments based on traffic characteristics (e.g., curvature, grade, number of lanes), and each segment may be divided into lanes. Alignments between upstream and downstream lanes at adjacent segments and intersections are described by lane connectors. Travel demand, either as individual trips, or as aggregated trip counts by entities, are associated geographically and temporally to the network using origins, destinations, and desired departure or arrival time. Vehicle locations and trajectories, lane-segment-specific vehicle lane-occupancies/densities, vehicle gap distributions, and speeds can be recorded for short time intervals from observations and measurements and also from detailed microsimulation. These data can be used to analyze the likely travel times and other characteristics of potential vehicle trajectories at the lane-level from an origin to a destination. Similarly, these data items can be gathered for the components of trajectories that take place inside of intersections where delays are often experienced due to conflicting movements of vehicles and even pedestrians. If not all of the necessary data can be observed or measured in the field, detailed simulation can be used to supplement the available measurements for the needed locations and/or time intervals.

FIG. 1 depicts the aforementioned microsimulation of traffic in Phoenix, Ariz., in which box 1 represents an intersection, including vehicles and lane-level geometry, with a near-ground-truth level of detail, as shown in box 2. The model also includes detailed traffic signal timing and other traffic management data, as shown in box 3, enabling the accurate simulation of signal operations and drivers' behavioral responses to them. For example, box 4 illustrates the operational state of a traffic signal controller at an arbitrary time t, and box 5 represents the operational state of that controller at time t+10 seconds. This allows with high-fidelity simulation of both the demand (i.e., vehicles) and supply (i.e., lane-level geometries and traffic signal operations) elements of the environment in which a navigation system operates.

Lane level navigation problems abound even in small sections of metropolitan road networks due to their complex nature, a lack of information available to drivers and/or traffic management systems and staff, and insufficient analytical and predictive methods. The following examples may be illustrative.

Example 1

First, consider a junction between two major highways at a time of day when both roads are congested. On one of the highways, traffic has spilled back more than two miles on the lane designated for exiting from the one highway to the other highway. The three other lanes are moving but slowly and there are numerous lane changes being made by fidgety drivers. A driver needs to exit. Should that driver move into the exit lane at the end of the long queue, or travel in the next-rightmost lane and then force his/her way into the exit lane? If the latter, at what location should the lane change be attempted?

Example 2

In a two-lane roundabout, a driver needs to enter at one point and exit at the third exit point. What lanes should be used and to what extent?

Example 3

A work zone has blocked the right lane of a road. How far ahead of working area should signs be placed, and when should a driver in a lane to be closed start his/her maneuver into the open lanes?

Example 4

There is a lane drop coming. When and where should a driver attempt to move out of the lane that is ending? This will depend upon the extant conditions including those predicted for some number of minutes. Drivers who are familiar with the road will know that the lane drop is present, while others such as tourists will not. How should the system account for both informed and uninformed drivers?

Example 5

The highway ahead is blocked but there is an unblocked exit ramp from the highway. There is a longer alternative route from the exit ramp around the congested area. Will it save time to leave the highway rather than stay on it? It is not clear how long the blockage will take to clear and it is not clear how many will take the alternative route and degrade its performance.

Generally discretionary lane changes involve anticipation of improved driving experience in the target lanes. Changing lanes in congested traffic involves delay and causes delay to others making minimization of individual delay and overall system delay difficult to predict.

For example, it is difficult to know the state of a traffic signal or a toll plaza fifteen minutes in the future. It would be unreasonable to think that the state would be the same as it was one day earlier or on the same day in the previous week, even at the same time of day. However, a comprehensive traffic simulation system capable of representing the elements and complexities of the traffic environment like that depicted in FIG. 2 can assimilate historical information and real-time traffic information available from the field and then relate that information into useful short-term predictions and, thus, meaningful lane-level route guidance.

Figure 2:
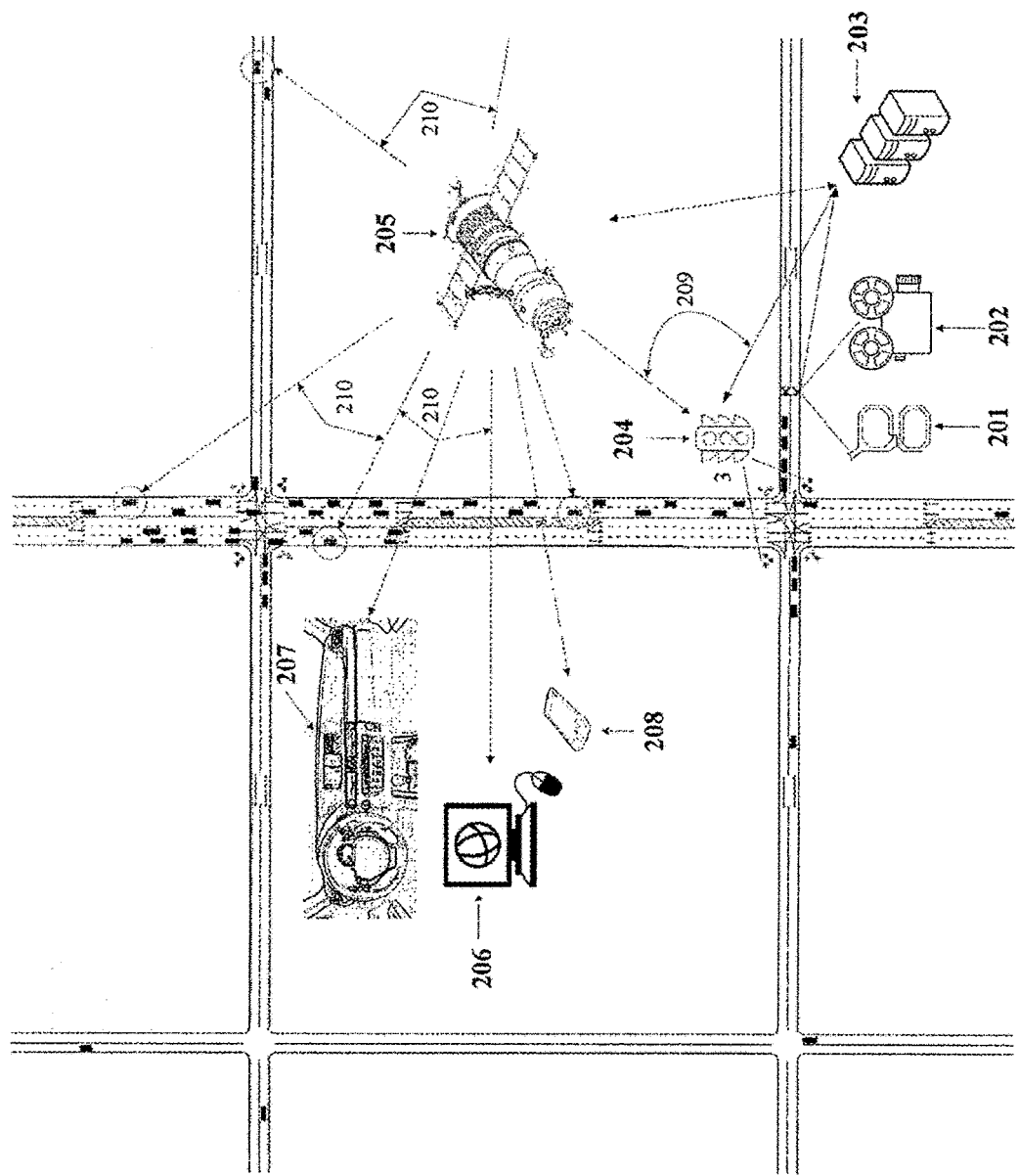
FIG. 2 shows a traffic environment in which embodiments of the invention may operate.

FIG. 2 illustrates the context in which systems according to embodiments of the invention may operate. Hardware commonly found in the field—for example, magnetic loop detectors 201 embedded in pavement and traffic cameras 202—can provide real-time traffic data, which can be transmitted over electrical or optical cable, or wirelessly, to a centralized computing environment 203, where historical traffic data are also stored. Traffic signal controllers 204 also provide real-time state information for remote performance monitoring. Satellite and terrestrial wireless communication devices 205 support the transmission of traffic data to the computing environment 203, where simulations are run and routing strategies are tested before guidance is sent back to travelers through those same communication devices. Drivers yet to depart, and en route, may receive guidance on personal computers 206 at home or work, or on on-board systems 207, or on mobile devices 208 (including hand-held navigation devices as well as mobile telephones). Instructions 209 can also be returned to the traffic signal control devices 204 to better manage traffic. As a result, various users of the system (e.g., drivers of commercial vehicles, passenger automobiles, etc.) may receive lane-level route guidance 210 that is tailored to their particular need or objective.

A navigation engine that uses the lane-level information along with a more elaborate network graph makes it possible to generate recommended lane-level routes. The guidance takes into account the time and effort spent in changing lanes as well as expected operant speeds in lanes and at and through intersections (whether signalized or unsignalized), or expected speeds in merging and weaving sections and lanes on highways. These can be measured from observations of various types and verified or validated through application of Highway Capacity Manual methods or more detailed simulation. Microsimulation can be used to generate or supplement the data if the data are not available from other sources or cannot be cost-effectively gathered.

A navigation engine that simulates regional traffic flow at very short time intervals ranging from 0.1 seconds to 1 second can be used to evaluate alternative lane-level routes. In one embodiment, a simulated probe vehicle is used to calculate the performance of a particular lane-level trajectory. Multiple simulation runs make it possible to estimate the variance in travel time associated with any given trajectory and to consider the variance and thus the reliability of the lane-level route. Any lane-level route choice will be subject to numerous stochastic influences that arise from traffic signals and the inherently variable nature of traffic flows. Navigation systems could consider reliability in addition to expected travel time in recommending routes to travelers.

Route selection for navigation has traditionally used some form of shortest path calculation using widely-known and deeply-researched algorithms for correct and quick calculation of the best path. These methods are applied at the link level using node to node or link to link shortest path methods. If suitable data can be obtained, the very same methods can be applied at the lane-level, although the size of the network will be very large for a metropolitan region and keeping track of the results is more complex because transition between a pair of lanes on a path may occur anywhere along the path, rather than only at particular points along the lane. There are also route choice models using discrete choice formulations than can be extended to consider lane-level details.

Link-level and lane-level shortest paths with various objective functions can provide recommendations for lane-level navigation or be used to generate candidates for more refined lane-level navigation. The paradigm of shortest path calculation has a resolution limit of the link or link segment and does not lend itself to the possibility of continuous lane change possibilities within links. This limitation cannot be profitably addressed through creating more numerous, shorter links which would, in of itself, create other problems in terms of data needs and data validity.

Through microsimulation, candidate lane-level shortest-path trajectories can be evaluated with alternative and intelligently perturbed lane-changing locations and timing. Thus the simulation can be used to refine and select among lane-level guidance alternatives.

A geographically accurate lane-level network database as well as real-time measurement and computer-synthesized traffic information are used in the simulation. Because the volume of data can be substantial, the navigation network and level of detail used must be selected carefully to reduce the computational and communication burden.

Figure 3:
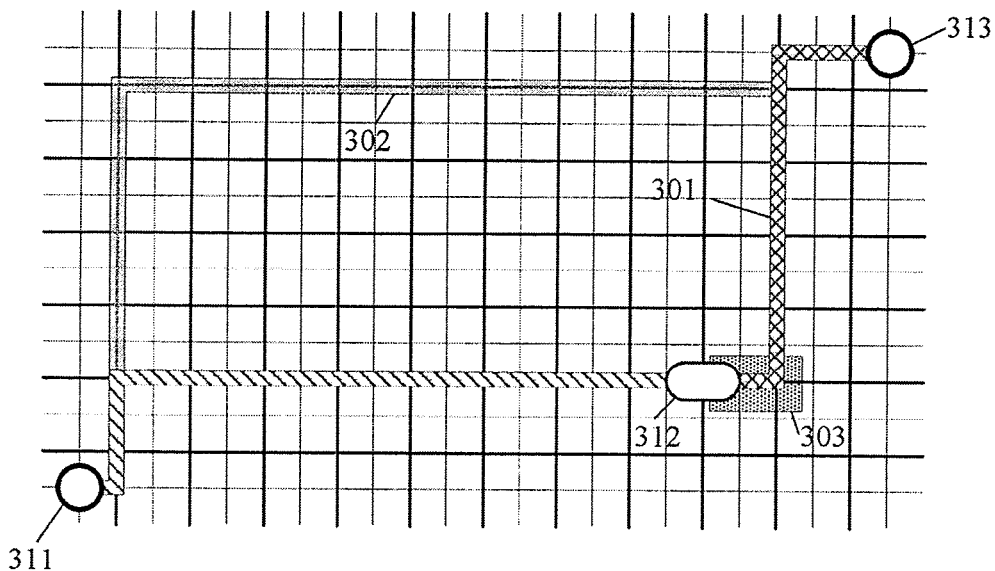
FIG. 3 shows two candidate paths between two points.
Figure 4:
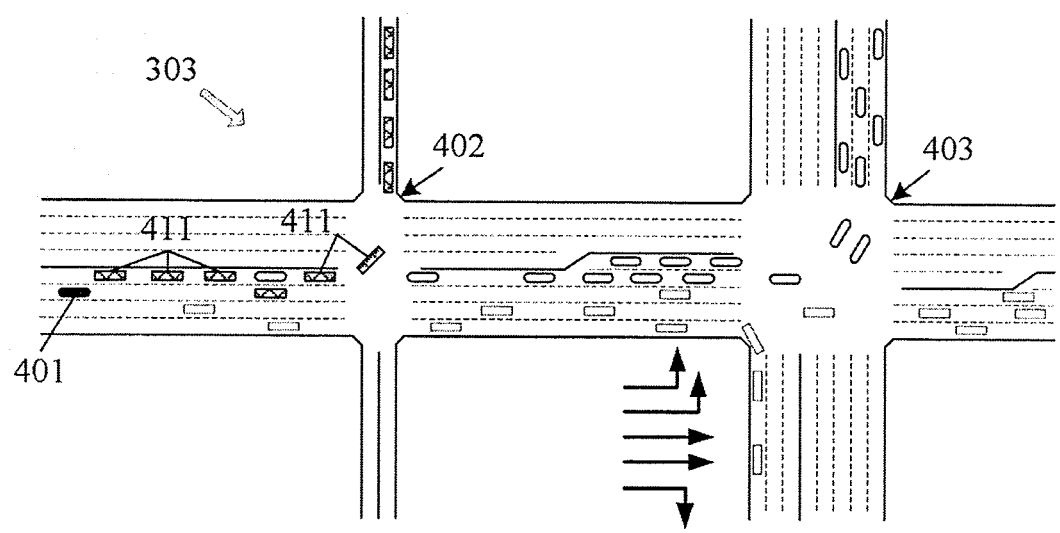
FIG. 4 shows greater detail of a portion of FIG. 3.

Anticipatory, route-strategic, planned lane changes can improve upon travelers travel times and routes in a significant way. FIG. 3 shows two of candidate paths 301, 302 from location 311 to location 313. In this case, a driver has chosen the hatched path and is approaching location 312. The distance or number of links (i.e., road segments) downstream on the chosen path for which a driver must plan near-term lane changing decisions is called the look-ahead range. The immediate downstream road segments connecting the next two intersections are highlighted at 303 and shown in greater detail in FIG. 4.

The lane connections and traffic conditions at the lane level are important information for a good navigation system. In our example, the driver of vehicle 401 intends to make a left turn at intersection 403, where the two left-lanes are allowed to make the left turn. If lane connection is of concern, then the driver should move into the left-most lane at the current location in order to stay on path. However, the driver may delay the lane change until passing the first intersection 402 if a large number of vehicles 411 are making a left turn at intersection 402 and there is a queue spilling back for that turning movement. The lane-level navigation system and its supporting database, recognizing this pattern of congestion in the appropriate lane-level context, and acknowledging certain driver behaviors, is capable of optimizing the path at the lane level and guiding the driver accordingly.

Figure 5:
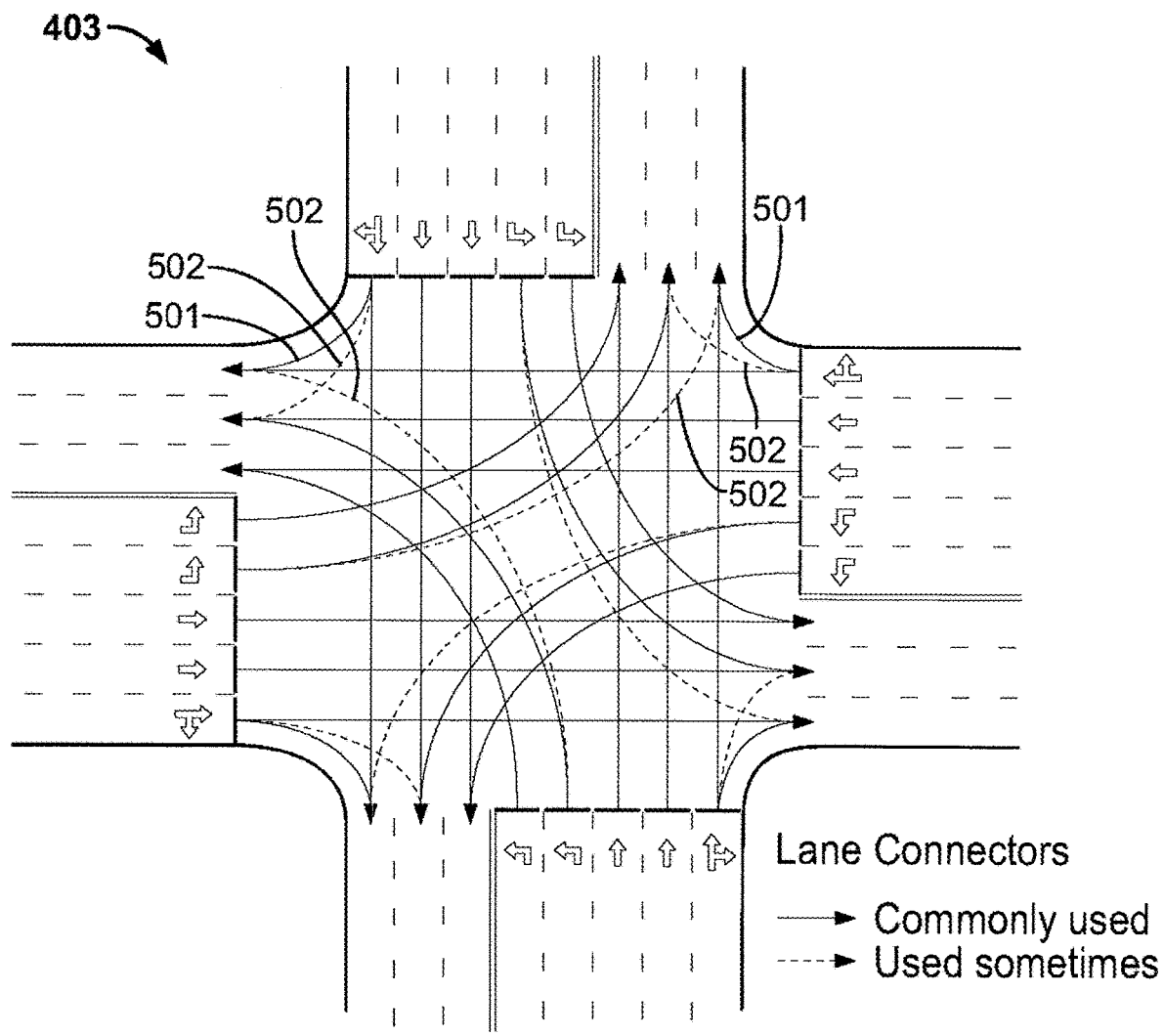
FIG. 5 shows greater detail of a portion of FIG. 4.

Based on the road type, number of lanes, geography of the road, and existence of traffic signals and signs, embodiments of the invention can automatically generate the lane connectivity in typical urban intersection and freeway interchange configurations. The result of the automatically generated lane connections can be validated and further revised if necessary using survey data, aerial imagery, and vehicle trajectory data. As an example, FIG. 5 illustrates the lane connection at intersection 403 in more detail. The curved lines with arrowheads inside the intersection are called lane connectors. Lane connectors indicate the geometric alignments and permitted movements between lanes. As features in the lane-level database described, the lane connectors support the storage of data indicating the tendency, or probability, of drivers to use the particular connector. As shown, solid lane connectors 501 are more commonly used than dashed lane connectors 502.

Figure 6:
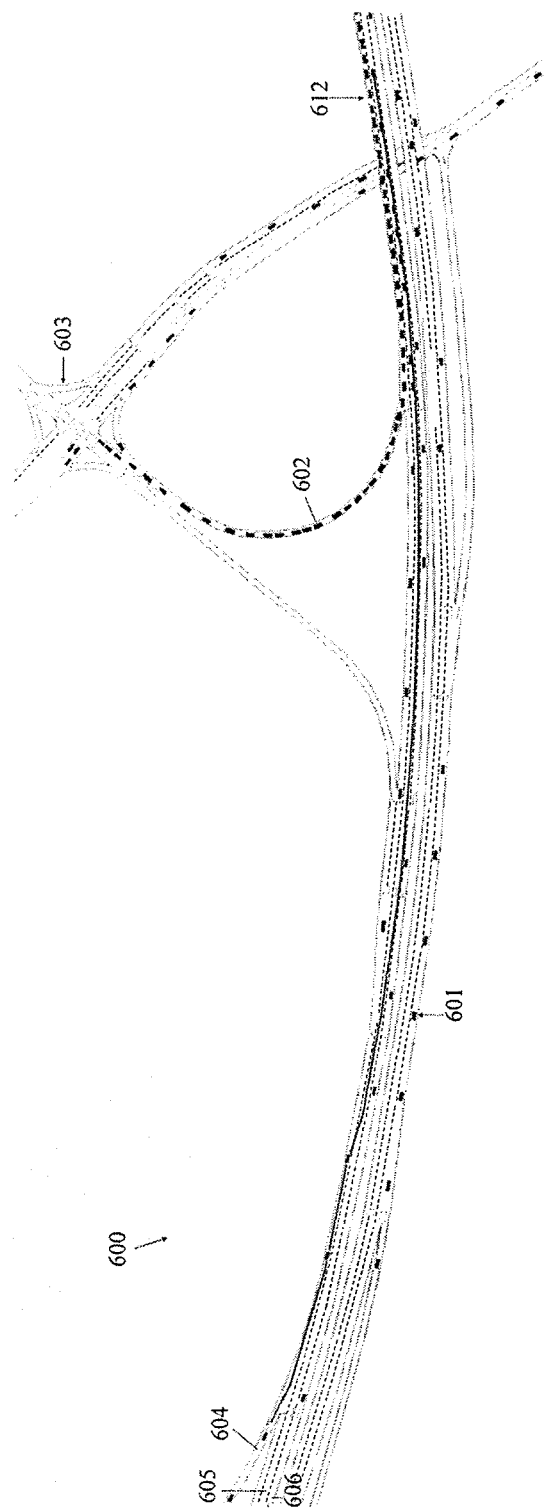
FIG. 6 shows an example of a traffic condition leading to an anticipatory lane change.

FIG. 6 shows another example 600 of an anticipatory lane change. This example involves a limited-access highway 601. The eastbound off-ramp 602 has a queue 612 of vehicles spilling back because of traffic volumes exceeding capacity at a downstream intersection 603. Drivers intending to take the next off-ramp 604, who might otherwise have moved right before off-ramp 602, would be advised to use the center and left lanes 605, 606, rather than join queue 612 forming at off-ramp 602, particularly if the off-ramp 604 is further downstream or there exist multiple lane connectors to off-ramp 604, thereby avoiding unnecessary queuing and enjoying a shorter travel time. On the other hand, if there is a higher probability of missing the optimal and intended route (e.g., because off-ramp 604 is very close to off-ramp 602), or the cost of using the alternative route is excessive, then an earlier lane change, even though it results in joining queue 612, may constitute the best course of action and would be recommended to the driver.

One element of the lane-level navigation system is the inclusion of a lane-level route optimizer which can be used in addition to or instead of a link-level optimizer. Given the origin, destination and vehicle type and preference (e.g., high occupancy vehicle (HOV), car vs. truck, value of time, etc.), the link-level optimizer computes candidate paths represented by a sub-network or a veritable "hammock" of link sequences connecting an origin and a destination. A hammock can be thought of as a network of links and nodes emanating from a single link at the origin, or the vehicle's current position, and converging at a single link at the destination. According to a predefined look-ahead threshold (preference), the lane-level optimizer evaluates the travel time, delay and driving experience on path candidates using either historical measurements of lane-level traffic density and speed, or microsimulation. The result of this evaluation is then used to derive the lane-level route guidance, and in some cases (e.g., none of the lane change maneuvers are possible or desirable) may also invoke the link-level optimizer to recompute the path candidates according to the revised criteria. In the microsimulation employed by the lane-level optimizer, traffic signals (which may be adaptive traffic signals) at downstream intersections (and other traffic controls, including, e.g., message signs and other driver information systems) are simulated to determine intersection delay realistically as are vehicle trajectories and conflicts inside of intersections. It should be noted that in some embodiments, the origin, destination and vehicle type and preference, and any other inputs, can be entered directly into the lane-level optimizer, without using a link-level optimizer at all.

Figure 7:
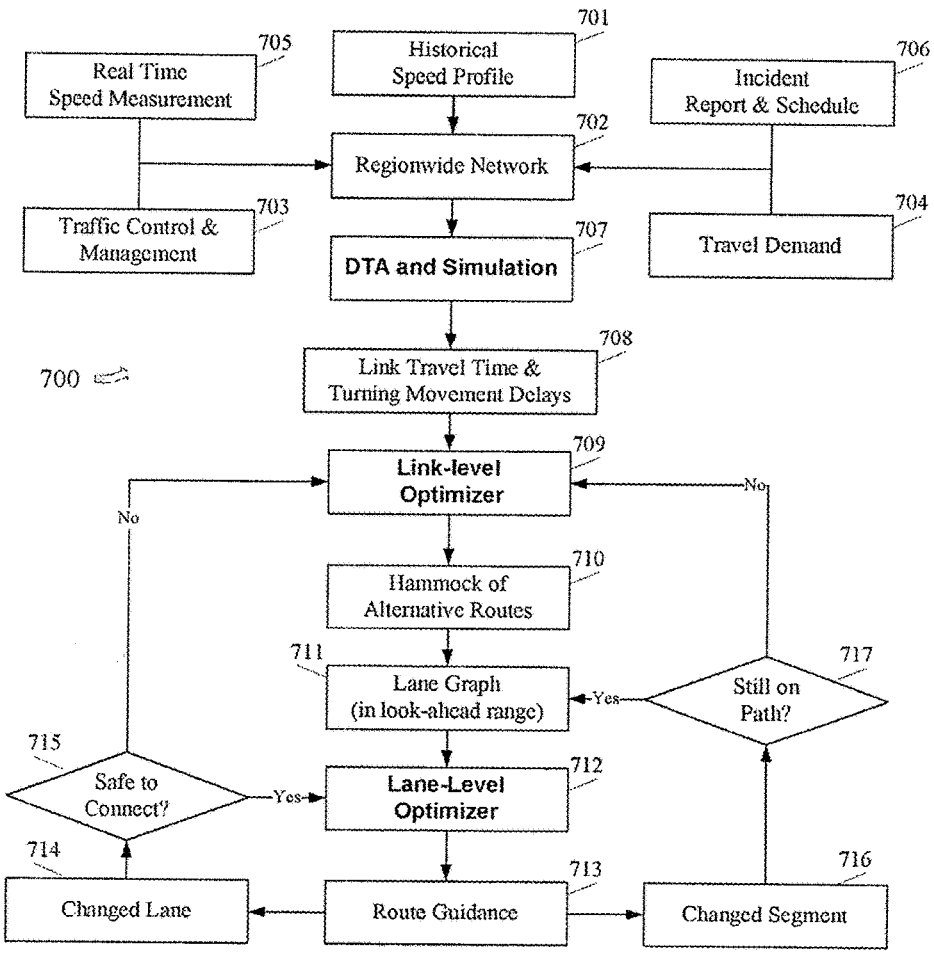
FIG. 7 is a flow diagram of a navigation engine according to embodiments of the invention.

The navigation engine 700 can be illustrated in the diagram in FIG. 7. In navigation engine 700, historical speed data 701 are used to populate a geographic database and model 702 representing the region-wide network (4). Records in the database represent road segments, lanes, and lane connectors as described. Together with historical speed data 701, the network is used to establish temporal and spatial patterns of traffic flow and congestion. Known traffic signal timing and management data 703 and estimates of travel demand 704, either measured or calibrated using historical data (e.g., traffic counts), also are stored with the network model and used to run simulations. Additionally, real-time data 705, including speed measurements from mobile telephones, detectors, and cameras, and incident reports and timing data 706, for example from a traffic management center, are used to feed current information to the network.

With lane-level model 702 of the region-wide network using the historical and real-time information, accurate dynamic traffic assignments and simulations are run at 707 to produce predictions of travel times and turning movement delays 708 that in turn drive a link-level route optimizer 709. A set of alternative link paths represented by a hammock 710 connecting a traveler's origin to his/her destination is produced by optimizer 709. In one embodiment, a set of lane graphs 711 is developed for the traveler. Ideally, the lane graphs encompass the entirety of the optimal link route, but if computational resources are not sufficient, the lane graph may be limited to a look-ahead range, as shown.

Based on the lane graph, an optimal lane path is produced at lane-level optimizer 712 and transmitted to the traveler in the form of lane changing and turning movement route guidance instructions 713. If the traveler changes lanes at 714, engine 700 determines at 715 whether the vehicle is still in the set of lanes deemed by the lane graph to be connected to the optimal lane path. If the traveler is still in a "connected" lane, lane-level optimizer 712 updates the instructions to the traveler based on the current lane. Otherwise, engine 700 returns to the link-level optimizer 709.

When it is detected at 716 that the traveler has moved to a new road segment, engine 700 determines at 717 whether the traveler is on a road segment on the current advised link path, and if so the lane graph 711 is updated to reflect the new position in the network. Otherwise, the engine returns to the link-level optimizer 709. In this way, the traveler's location in relation to the region-wide network is continually tracked by engine 700, which uses simulation coupled with link-level optimizer 709 and lane-level optimizer 712 to guide the traveler.

In an embodiment in which link-level optimizer 709 is omitted, all link-level and lane-level computations are performed in the lane-level optimizer. That includes any recomputations required based on lane or segment changes.

In navigation engine 700, possible lane-level trajectories are evaluated by looking ahead at the traffic in lanes downstream on alternative routes by constructing a lane-level network or graph of variable size for only the part of routes within a predefined look-ahead range, but it can also potentially consider all lane-level paths from a location to the vehicle's destination if available computation and/or communication capacity permit.

A lane-level network (otherwise known as a lane graph) is a model to represent the detailed information on the lane use regulation, lane change and lane alignment in the road network. It is specifically designed to support lane-level navigation and microsimulation of vehicle movements. The design of the lane graph can be best shown by a simplified example as shown in FIG. 8.

Figure 8:
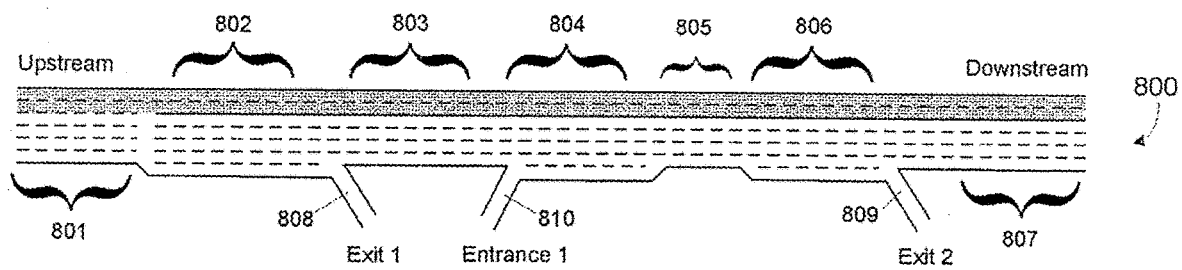
FIG. 8 is an example of a road segment.

FIG. 8 shows a stretch of eastbound freeway 800 including ten road segments (length not to scale). In this example, segments 801-807 are freeway, segments 808 and 809 are off-ramps, and segment 810 is an on-ramp. Two left-most lanes are designate as being restricted to high occupancy/toll (HOT) use only, where lane changes between HOT and general-purpose (GP) lanes are allowed (shown by dashed lines) in segment 801 but prohibited (shown by solid line between second and third lanes 811, 812) in segments 802-807. While a HOT driver may use all lanes, which lane the driver should be using may depend on his/her destination and the chosen route. On the other hand, because of the existence of a barrier and/or lane-change regulation, which route the driver should be taking also depends on which lane he/she is currently in. The optimal lane-level path further depends on the traffic conditions on the HOT and GP lanes. The lane graph model of this invention is designed to streamline the operation of lane-level optimizer.

Figure 9:
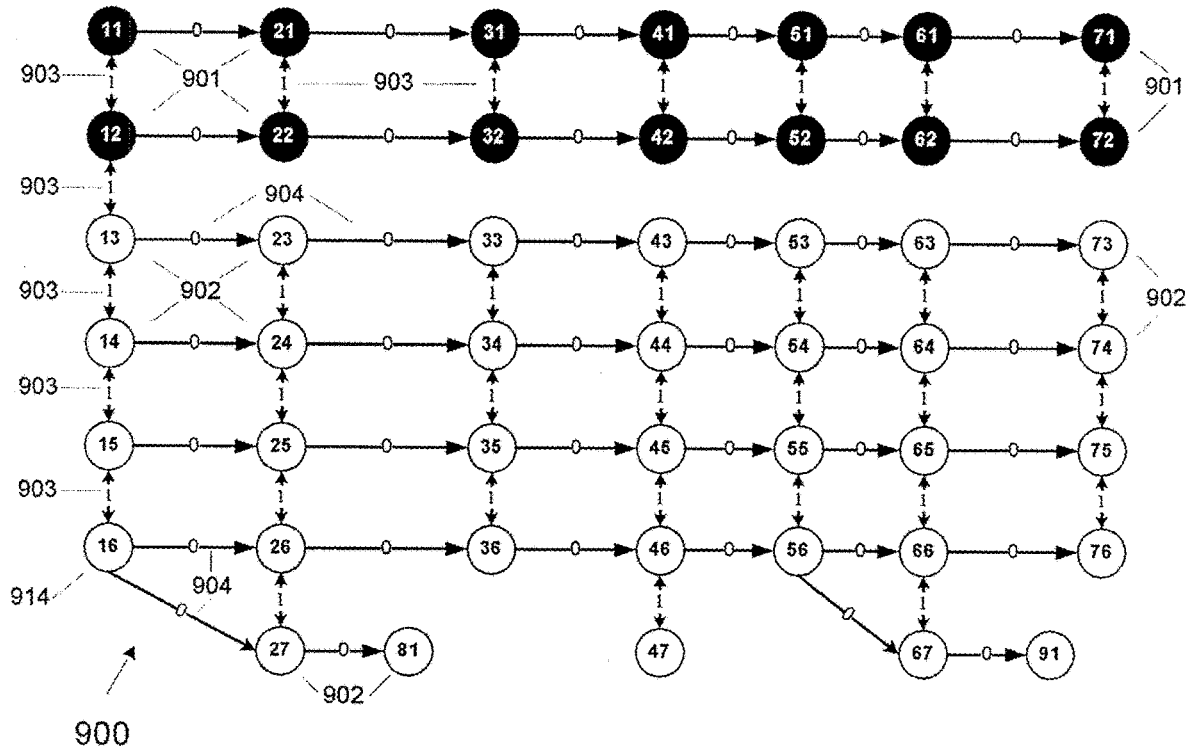
FIG. 9 is a lane graph representing the road segment of FIG. 8.

As an example, FIG. 9 is part of lane graph 900 for a driver traveling in upstream segment 1. The graph contains vertices (representing lanes) and edges (representing relations between lanes). Depending whether a driver is going to exit 1 (808), exit 2 (809), or further downstream through the mainline, some of the vertices that represent the lanes can be trimmed (e.g., removed from the driver's intended route) or more vertices can be added.

In the lane graph 900 of FIG. 9, each vertex (circle) represents a lane within a specific road segment.

The black vertices 901 are lanes restricted for HOT vehicles; while other vertices 902 represent the lanes which have no lane use restriction.

A vertical line 903 with double arrow between a pairs of vertices represents lane change maneuvers between the neighbor lanes. If the lane change is allowed only in one direction (e.g., left-to-right, but not right-to-left, or vice versa), then a single arrow would be drawn between a pair of adjacent lanes.

Each horizontal or diagonal line 904 in lane graph 900 represents a lane connector in the network. Lane connectors describe the alignment between upstream and downstream lanes. If more than one such line 904 connects multiple upstream lane vertices to a downstream lane vertex, then it represents a merge; if more than one such line 904 connects one upstream lane vertex to multiple downstream lane vertices, then it represent lane split (i.e., divergence) 914.

The numbers (1 or 0) on each line 904 represent the cost assigned to the lane change maneuver. With these costs assigned, computing a lane-level path from driver's current position to any downstream link can be performed by well-established shortest path algorithms. The minimum cost of the path gives the minimum number of lane changes required for the driver to stay on his/her current path. By tracking the predecessor of each vertex along the shortest path, it can be determined where a lane change should take place and its distance from the current position. By applying techniques such as depth-first or breadth-first search on lane graph 900, alternative lane paths from the current position (i.e., origin) to a chosen downstream destination can be enumerated.

Similarly, travel speed, delay, traffic density, and gaps between vehicles for the lanes in the graph can be recorded as the attributes for lane vertices in the graph. The possibilities and difficulties of lane change maneuver can be represented by the attributes of edges that connect neighbor lanes in the graph. Searching techniques, therefore, can be performed on the lane graph to evaluate the cost and driving experience along a candidate lane path and select the optimal location to start the required lane changes.

In this framework, a lane path, either that representing a vehicle's travel diary up to the current position or that representing lane-level guidance derived from the foregoing techniques, can be represented by geographic coordinates and events or by a sequence of data triplets. Each data triplet could contain a (1) unique road segment identifier (i.e., a column of vertices in the lane graph), a (2) lane position index in the segment (i.e., a row of vertices in the lane graph), and (3) the position of a lane change expressed in terms of relative distance from either end of the lane. When formulating a lane path for recommendation to the driver, the distance reflects the location at which a lane change is advised, allowing for a comfortable interval before which the lane change should be completed. Advisory lane change positions can be derived from current or historical speed data, which are used to characterize the degree of difficulty of a lane change at a given position. When providing guidance, the data triplets could be converted to geographic coordinates and event notices and be coordinated with real-time GPS information on the vehicle's current location.

Lane changes (or the act of staying in the current lane when no lane change should be made) can be thought of as being of two types: mandatory and discretionary. Mandatory lane changes refer to the cases in which a lane change must be made in order to make a turn that is required to remain on a given route as defined at the link level; while discretionary lane changes refer to the lane change maneuvers in order to improve the driving experience such as to gain speed or to pass a heavy vehicle, etc. When there exist multiple lane connections, mandatory lane changes may reduce the choice set (i.e., alternative trajectory paths) of discretionary lane changes.

One can further distinguish two types of discretionary lane changes. The first of these is based upon the immediate context of the link or link segment and the lanes therein or those immediately downstream. This corresponds to known simulators which have short look-ahead processes that select lanes while keeping vehicles on their routes as defined by link sequences. In this type of discretionary lane changing, decisions are inherently myopic and based upon the alternative lanes available in each route segment or perhaps on a few links downstream.

A second type of discretionary lane change is route-strategic and has the goal of improving the travel time or other figure of merit for the remainder or other significant portion of the route by focusing on the strategic choice of lane selections and the locations for lane-changing. This process is performed by adding and/or removing the lane vertices and edges in the lane graph. It can also be adjusted over the course of multiple simulation runs as the system learns which behaviors scenarios are superior in terms of the lane-level trajectory.

The reduction in delay and gain in speed associated with differing lane change locations can be further considered in computing the best lane-level path using methods well-known to those versed in the state of the practice of vehicle navigation systems and shortest path algorithms. These can be particularized to the location within the link or link segment and consider stochastic expected travel times and lane change probabilities.

Based on a combination of data from historical measurement and real-time measurement, numerous simulation runs can be used to synthesize and predict the likely travel time and traffic density along the alternative paths at the lane-level. The result of these simulation runs are then processed and used to evaluate the likely travel times for different lane-level routings and the recommended lane change locations. Since lane changes cannot be guaranteed at a specific location, navigation recommendations can include a first location at which to attempt a recommended lane change. Navigation instructions can also describe in advance a set of lane maneuvers that are recommended for the vehicle.

The recommended routes are dynamically determined based upon the time and location of the vehicle, and so can be optimized for the traffic conditions that will exist and be experienced during the duration of the vehicle's trip. Thus, accidents and work zones can be taken into account in the navigation guidance.

The prediction function and simulation provide capabilities over and above the use of historical or even real-time conditions as they more accurately represent the situation that a vehicle will find itself in the future portion of its trip.

The simulation engines used by link-level optimizer 709 and lane lane-level optimizer 712 can be customized to reflect driver preferences including those for the maximum speed, lane preferences, simplicity of route, value of time, desirable time window of the arrival, and vehicle classification associated to lane use restrictions and toll fees, if any. The simulation engine can also take adaptive traffic signal optimization into account when and where it is present.

Link-level optimizer 709 generates link-level alternative routes. It can provide multiple alternative routes from a driver's current position to the desired destination. These alternative routes can be formulated as a sub-network or "hammock" of a directional sequence of links. For the chosen route, as the guided vehicle move from one road segment to next or changes lane, the downstream portion of the links along the route within a look-ahead range is then expanded to a lane-level network or graph 711 as presented earlier. Lane-level optimizer 712 is used to generate possible lane-level trajectories. These lane-level alternative paths are then evaluated to determine the optimal one based on preset rules and criteria.

With the alternative routes determined first, the communication between an in-vehicle navigation device and a remote server can be kept minimal. This allows the navigation engine 700 to interact with real-time data feeds on lane conditions and queues and give adaptive route guidance.

Multiple simulation runs can be further utilized to refine or establish the robustness of any route recommendation. These simulation runs can give an idea of the likelihood that a given route will be traversable in the expected minimum time. For choosing the best route for a single vehicle trip, the simulation can evaluate likely scenarios under current conditions and provide a range of effective alternatives. Dynamic traffic assignment (DTA) and simulation can be performed on the server side, or in a remote distributed computing environment, to estimate the network state, which considers reliability as well as the expected travel time. Historical speed profiles, real-time measurements of speed and travel time, information on traffic management and control, and travel demand estimates and traffic incidents all feed into the network state estimator and predictor and are used to determine current and future speed, travel time, and delay on the links and turning movements in the region-wide network.

Generally, a dynamic user equilibrium traffic assignment model may be used to model traffic. In this formulation, an iterative solution may be computed such that at each iteration, vehicles choose their best path best upon a prior iterations predicted travel times by time period on the network. At the computed approximated equilibrium solution, the travel times on the network by time interval have stopped changing and the route choices will therefore have stabilized. In a preferred embodiment, a microsimulation-based DTA will be used for providing route and lane-level navigation guidance. This will be derived from identifying the best trajectory for a single vehicle making a trip between a specific origin and specific destination at a given departure time. Also, various events can be factored into the simulation and computation of the best lane-level trajectory such as an accident or a road modification due to road construction or maintenance. Simulation makes it possible to incorporate the future effects that cannot be measured contemporaneously or known from history.

Lane drops and unanticipated incidents and work zones lead to increased congestion. The system described uses traffic simulation to estimate the traffic condition upstream of the events (incidents and work zones) and the amount of delay. It guides the driver to determine the optimal position of lane changes that not only optimize the individual's driving experiences, but that make better use of the capacity available to increase the throughput at these bottlenecks. Lane-level traffic management has the potential to improve public safety by reducing accidents as well as reducing delay and energy consumption associated with vehicular traffic.

The lane-level guidance can lead to differences from the link-level shortest path. While this is clearly evident in the earlier example where barriers exist between lanes or the number of required lane changes is too many to maneuver safely at the prevailing speed within the distance available, it is less obvious when the contributing factors are the traffic pattern and the difference in traffic conditions across lanes. At the link level, path calculation has to be performed on some kind of average of the travel time or generalized cost. However, vehicles in a traffic stream are often traveling to different destinations, and traffic densities and lane utilization across road segments are not necessary even or balanced. Furthermore, a driver's value of time and perception of delay may differ. Thus, the shortest path based on mean travel time, turning delay, and/or generalized cost for an "average" driver may not necessarily be the optimal path for a specific driver. In the described system, the need for individualism of driver's navigation is explicitly considered by taking into account the vehicle's location and the varying traffic conditions across lanes.

As with many route guidance systems already available, the system described may include the link-level route calculation. Here, however, that calculation is only the first step for screening route candidates in a wide-area. The calculation could also serve as a data reduction step so the more detailed lane-level path evaluation is needed only for a much smaller data set, so that the computation and communication requirement is minimized.

In one particular embodiment, expected travel times are used and minimized, but other aspects of the trip could be included in the objective to be optimized. This includes, but is not limited to, tolls incurred for the use of certain roads or lanes or for entering a restricted area, the number of lane changes required and the remaining distance within which the lane changes must be performed, the number of controlled (e.g., signalized, stop sign-controlled) intersections, the presence of parked vehicles, vehicles entering from and leaving for side streets and driveways, and the prevalence of pedestrian traffic.

Improvements in the accuracy of GPS systems, laser and radar range finders, microwave, image processing and object recognition, may provide the ability to locate vehicles reliably in lanes and at locations within intersections and could be used to feed the navigation engine as described. Expansion of the capacity of wireless communication with lower costs may enable the described system to send the location-specific traffic data and request for navigation to a central server, which runs the traffic prediction using simulation and generates optimized lane-level path and navigation instructions on an individual basis.

Since the simulation and vehicle routing is at the lane-level, it can enable the traffic controller to conduct optimization of signal timing, phasing and coordination based on predicted performance measures such as delays, throughput, number of stops, and percentage of vehicles arriving at green signals. Such optimization may either be performed off-line using software that utilizes the described method, or by components in the controller to perform online signal optimization via real-time communication with the approaching vehicles and estimates of the pattern of vehicle arrivals.

The described lane-level routing method may also assist self-driving automated vehicles to make appropriate lane-change decisions. Rather than using predefined paths, the automated vehicle can continuously evaluate its alternative lane paths, choose the optimal route and make necessary lane changes to stay on the prescribed path.

The navigation engine may variously be run on a cluster of computers that serves results over the Internet, on in-vehicle computers, on dedicated navigation devices, on smart telephones, or on other similarly capable computing devices that may be developed. Running multiple instances simultaneously may result in faster and better predictions.

Figure 10:
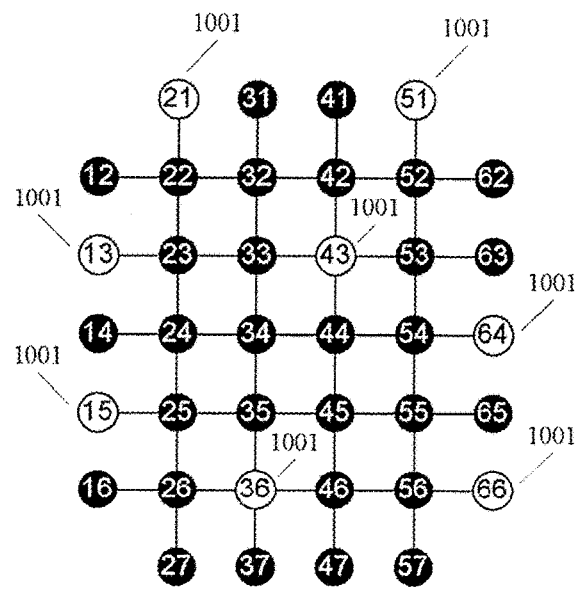
FIG. 10 is a diagram illustrating multi-threading of a simulation.

While microscopic simulation is used to provide lane-level performance and routing, some portions of the network could be simulated by coarser macroscopic or mesoscopic or a hybrid combination with microscopic means. Due to the computational burden involved, the simulation would typically be multi-threaded and also distributed. The multi-threading of the simulation of vehicle movement and network state update can be improved by using a node adjacency matrix to assign tasks to each thread such that all the active threads are processing nodes that are not adjacent to one another and the maximum number of threads is put to work. This method avoids the certain locking of threads needed for write-access of shared data items. As shown in the diagram in FIG. 10, if the white nodes 1001 are the ones actively processed by eight threads, then the vehicle movements managed by these threads can be safely performed without locking the update of location-specific variables. This method also helps to balance the workload among the threads because any free thread is immediately put to work (unless the network is too small compared to the number of threads available and no non-adjacent nodes exist that are ready for processing).

Figure 11:
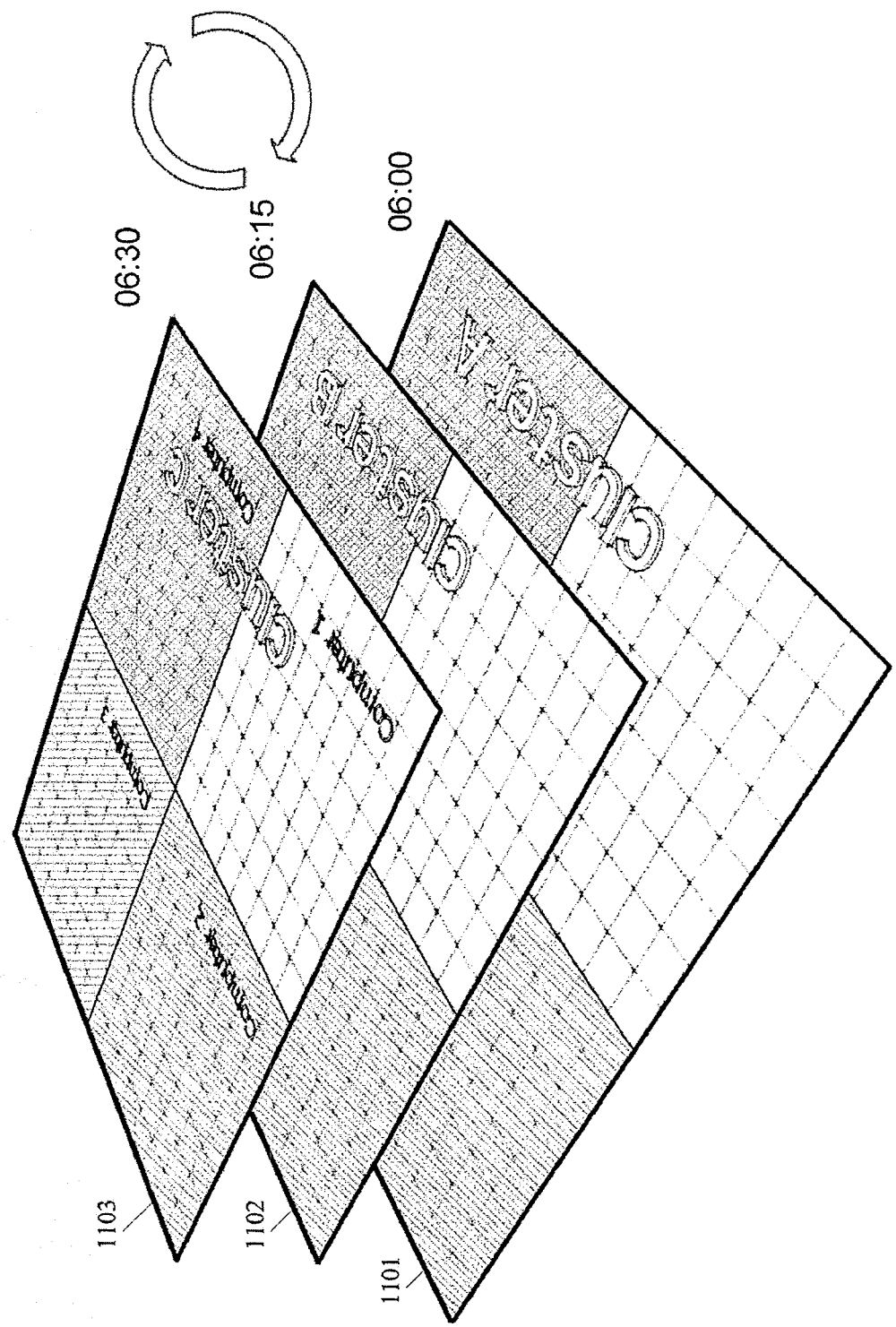
FIG. 11 is diagram illustrating clustering of computers performing a simulation.

The simulation can also be distributed to a cluster of multiple computers based on network decomposition, which minimizes the number of boundary links between sub-networks and balances the load among the computers in the cluster. By minimizing the thread-locking on each computer responsible for a sub-network, and limiting the amount of required communication between the computers that jointly perform the region-wide simulation, on-time computational performance of the network state estimation and prediction can be achieved. Because the traffic measurement and network events occur in real time, the system operates in a rolling horizon style. For every 5, 10, 15, or 30 minutes, as the new measurements and events data become available, a new cluster of computers is activated to perform network state estimation and traffic prediction for the next time period. The diagram in FIG. 11 illustrates how three clusters 1101, 1102, 1103 of computers take turns in rotation to perform distributed travel time estimation and traffic prediction for different time periods. Each computer in a class simulates part of the network based on network decomposition.

Once a new set of network state estimations and traffic predictions becomes available, the link-level route optimizer is put to work for subscribed drivers. The link-level route optimizer computes alternative routes at the current time from each driver's current position to his/her desired destination. As explained earlier, the alternative route can be described as a sub-network or as a hammock of sequences of directional links. Based on an individual driver's specific preference, these alternative routes are evaluated to compute a performance measure and to provide route guidance based on current conditions.

Given a desired route or a set of alternative routes, a lane graph may be constructed for the portion of route within a look-ahead range. This allows more detailed microsimulation to be performed and data to be assembled only for a much smaller and selected area of the network. The task of the lane-level path optimizer, therefore, is to evaluate the alternative trajectories or lane paths to estimate the travel time and delay and compute an index of driving experience. The best alternative is then recommended as navigation guidance.

Lane changes are not always possible at the optimal desired location. Lane changes require the presence of suitable gaps in the target lane appropriate for the speed of travel and the driver's aggressiveness. The system described can assess the difficulty of lane changes and recommend earlier or later lane changes based upon measured or predicted lane occupancies. Whether a lane change should be recommend earlier or later can be user defined. Automated learning from the driving habit of the specific user is included in the system so that the navigation guidance will be tailored to driving behavior and expectation.

Consistency in route guidance and in simulated traffic may not be readily achievable by available techniques without enhancement or modification. In dynamic (time-dependent) best path calculations estimates are required of the link or lane travel times in future time intervals. Yet even if these are taken from previously simulated traffic conditions, those estimates may be flawed or inconsistent with the conditions for which and at the time that the route guidance is first produced or later updated.

Verification of lane-level guidance can be verified by performing microsimulations and assessing the consequences.

A particular application of embodiments of the invention is in routing of emergency response vehicles. In conditions of emergency response, the normal driving behavior of vehicles in the traffic stream is altered by their response to sirens and visual detection of emergency response vehicles. While these responses and behavioral compliance can be observed from time to time, the specific consequences will depend upon road geometry and traffic levels and these can be simulated with microsimulation. Similarly, the behavioral model in the traffic simulation for the emergency vehicles themselves can reflect their target speeds and the ability to use lanes in the opposing direction and willingness to ignore traffic signals to reach their destinations as quickly as possible. Here too, lane-level routing strategies may easily outperform drivers' conventional knowledge of shortest link-level routes leading to further time benefits. Similarly, these systems and methods can be used to determine evacuation routes in case of emergency. The model for driver behavior can be modified to reflect how drivers behave or might behave under evacuation conditions and in response to guidance provided to the public.

Another application of lane-level routing is for commercial service or delivery vehicles and also for snow plows and garbage trucks. These vehicles have different sizes and performance characteristics and often will have to navigate road segments that have legally and illegally parked vehicles that naturally affect their choice of lanes and stopping locations.

In the known case of arc routing such as that appropriate for postal deliveries and garbage collection, where entire groups of street segments must be traversed as opposed to point-to-point delivery operations, certain lane choices will be required and not discretionary. This can be accommodated in traffic microsimulation including simulation of the stopping behavior and specific delivery or collection activity which may ultimately lead to a better and more realistic allocation of workload to each vehicle and a better and more realistic estimate of the time required to perform the assigned tasks.

In the case of snow plowing, lane-level routing can be even more effective as decisions can be taken to open at least one lane on major roads and the choice of the lane-level overall route plan and trajectory for each vehicle can be more expertly planned, simulated, and carried out. Similarly, the plowing route can be designed to avoid completely missing smaller roads.

In all of these cases of routing of commercial and public vehicles, the presence of other traffic and parked vehicles can be represented more appropriately than in conventional routing systems that lack lane-level and vehicle-level detail.

While microscopic traffic simulation of the type described can provide lane-level navigation guidance for individual vehicles, it also offers improved capabilities for traffic management. In traffic management, strategies are implemented to smooth traffic flow. These strategies can be pre-determined for various conditions or be responsive to real-time and emerging conditions.

With respect to traffic management strategies, it is insufficient to focus on improving the performance for a single vehicle. Providing traffic management information to a plurality of vehicles through message signs and other communications can easily be done, but assessing effective strategies requires a more complex analysis as drivers adjust to emerging traffic conditions and newly provided information about those conditions. Region-wide dynamic traffic assignment that determines some form of equilibrium condition on the network can provide the needed predictions and be used to evaluate variations in traffic management strategies including tolling and more sophisticated measures such as dynamic road pricing.

The described system can be used as an engine to estimate the anticipatory travel times by a free public system or by private service provider(s) who sell traffic information and route guidance to subscribers. By collecting how users respond to the travel time information and route guidance, the system can include a self-tuning component to adjust its parameters such that route guidance will become more accurate as the system accumulates more data and learns from users' response over time.

The system can also be used to improve the performance of bus systems by selecting lane-level routing strategies for buses that are responsive to the overall traffic environment. Bus priority and/or signal preemption strategies, which are often lane-level in design or intent, can also be readily incorporated. Other modes of travel can also be incorporated and have lane-level guidance computed for them.

Thus, lane-level vehicle routing and navigation apparatus, and corresponding methods, have been provided. One skilled in the art will appreciate that the present invention can be practiced by other than the described embodiments, which are presented for purposes of illustration and not of limitation, and the present invention is limited only by the claims which follow.

What is claimed is:
1. A traffic signal system comprising:
   a computing unit including:
   a simulation module that performs, faster than real time, microsimulation of individual vehicles in a traffic stream, and
   a lane-level route optimizer that evaluates predicted conditions simultaneously along multiple alternative candidate paths, including at least one multi-lane path segment, from an origin to a destination as determined by said simulation module, and determines predicted performance measures; and
   a traffic signal controller that receives instructions from the computing unit, based on the predicted performance measures, and adjusts traffic signals for managing traffic.
2. The traffic signal system of claim 1 wherein the traffic signal controller adjusts traffic signals to optimize signal timing, phasing and coordination.
3. The traffic signal system of claim 1 wherein the predicted performance measures comprise at least one of delays, throughput, number of stops, and percentage of vehicles arriving at green signals.
4. The traffic signal system of claim 1 wherein the computing unit receives real-time traffic data for use in at least one of the simulation module and the lane-level route optimizer.
5. The traffic signal system of claim 4 further comprising inputs for the real-time traffic data.
6. The traffic signal system of claim 5 wherein the inputs for the real-time traffic data comprise at least one magnetic loop detector.
7. The traffic signal system of claim 5 wherein the inputs for the real-time traffic data comprise at least one traffic camera.
8. A traffic signal control method comprising:
   performing, faster than real time, in a simulation module of a computing unit, microsimulation of individual vehicles in a traffic stream, and
   evaluating, in a link-optimizing engine, predicted conditions, simultaneously along multiple alternative candidate paths, including at least one multi-lane path segment, from an origin to a destination as determined by said simulation module, to determine predicted performance measures; and
   providing instructions from the computing unit to a traffic signal controller, based on the predicted performance measures, to adjust traffic signals for managing traffic.
9. The traffic signal control method of claim 8 wherein the providing instructions comprises adjusting traffic signals to optimize at least one of signal timing, phasing and coordination.
10. The traffic signal control method of claim 8 wherein the predicted performance measures comprise at least one of delays, throughput, number of stops, and percentage of vehicles arriving at green signals.
11. The traffic signal control method of claim 8 further comprising receiving real-time traffic data at the computing unit for use in at least one of the performing microsimulation and the evaluating predicted conditions.
12. The traffic signal control method of claim 11 wherein the receiving real-time traffic data comprises receiving data from at least one magnetic loop detector.
13. The traffic signal control method of claim 11 wherein the receiving real-time traffic data comprises receiving data from at least one traffic camera.

* * * * *

UNITED STATES PATENT AND TRADEMARK OFFICE
CERTIFICATE OF CORRECTION

PATENT NO. : 10,794,720 B2
APPLICATION NO. : 15/971010
DATED : October 6, 2020
INVENTOR(S) : Howard Slavin et al.

Page 1 of 1

It is certified that error appears in the above-identified patent and that said Letters Patent is hereby corrected as shown below:

In the Specification

Column 1, Line 8, after "of" should be inserted -- copending, --;
Line 12, after "and" should be inserted -- copending --.

Signed and Sealed this
Fifteenth Day of December, 2020

Andrei Iancu
*Director of the United States Patent and Trademark Office*